United States Patent [19]

Hunzicker

[11] 4,415,019

[45] Nov. 15, 1983

[54] HEAT EXCHANGE VENTILATING UNIT

[75] Inventor: Dean L. Hunzicker, Madison, Wis.

[73] Assignee: Hunzicker-Riley, Inc., Verona, Wis.

[21] Appl. No.: 367,477

[22] Filed: Apr. 12, 1982

[51] Int. Cl.³ ............................................. F28F 9/00
[52] U.S. Cl. ...................................... 165/47; 165/78; 165/122; 165/166; 165/DIG. 12
[58] Field of Search .................. 165/78, DIG. 12, 59, 165/66, 47, 122, 76, 166

[56] References Cited

U.S. PATENT DOCUMENTS

| | | | |
|---|---|---|---|
| 2,019,351 | 10/1935 | Lathrop | 165/DIG. 12 |
| 2,615,687 | 10/1952 | Simmons | 165/78 |
| 3,656,542 | 4/1972 | Darm | 165/DIG. 12 |
| 3,742,725 | 7/1973 | Berger | 165/76 X |
| 4,118,083 | 10/1978 | Lackey et al. | 165/47 X |

Primary Examiner—Sheldon J. Richter
Attorney, Agent, or Firm—Isaksen, Lathrop, Esch, Hart & Clark

[57] ABSTRACT

A combined heat exchanging and ventilating unit is disclosed which is designed for roof installation on a building. The unit includes a heat exchange housing (12) with a heat exchange assembly (34) in it which is capable of being slid into or out of an intake portal (32) on the housing (12) so that easy access can be had to the heat exchange assembly (34) from the roof of the building. The heat exchange housing (12) is particularly designed so that a standard updraft ventilator fan (14) may be used to draw exhaust air through the unit.

10 Claims, 4 Drawing Figures

HEAT EXCHANGE VENTILATING UNIT

TECHNICAL FIELD

The present invention relates to ventilators in general, and, in particular, to ventilators having structure therein for conducting a heat exchange between the intake and outflow air passing through the ventilator.

BACKGROUND OF THE INVENTION

It is well known in the prior art that ventilating devices can be placed on the roofs of commercial buildings so as to draw air out of the building and allow input air to be introduced into the interior of the building. At least one example is known in the prior art, that shown in U.S. Pat. No. 4,149,590, of a device which includes a ventilator and an air conditioning unit in a common enclosure, to be mounted on the roof of a building, the enclosure also including provisions for heat exchange between the air going into and out of the building. In U.S. Pat. No. 3,270,738, a roof mounted heater is disclosed which includes a heat exchanger in it and which is adapted to be placed on the roof of a building.

There are also examples known in the prior art of devices which incorporate heat exchanging ventilating units into structural enclosures having particular features adapted to be installed in particular orientations in a building structure. Examples of devices which are adapted for such structural installations are shown in U.S. Pat. Nos. 3,256,930 and 4,048,811. Examples are also known in the prior art of particular structures which are especially designed so as to facilitate the installation of ventilating or heating equipment on the roofs of commercial buildings, such as those illustrated in U.S. Pat. Nos. 3,664,254 and 4,182,487.

The prior art is also cognizant of the use and structure of heat exchanging elements which include multiple layers of heat exchanging air passageways, with the passageways on each adjacent layer being oriented perpendicularly to the passageways on the next adjacent layer. Examples of patents illustrating such heat exchanging elements include U.S. Pat. Nos. 3,666,007, 4,051,898, and 4,099,928.

SUMMARY OF THE INVENTION

The present invention is summarized in that a combined ventilating and heat exchanging unit includes: a heat exchange housing adapted to be placed on the roof of a building, the heat exchange housing having an open bottom, an exit portal formed in the top thereof, and an intake portal formed on one side thereof; a ventilator fan received on the top of the exhaust housing so as to draw air out from the exhaust portal and exhaust it into the atmosphere; air handling and conditioning means operably connected to the open bottom of the heat exchange housing so as to conduct stale air to be exhausted to the housing and to convey fresh air into the interior of the building; and a heat exchange assembly capable of conducting a heat exchange between air passing from the air handling means through to the exit portal and air passing from the intake portal through to the air handling means, the heat exchange assembly sized and shaped so that it can slide into and out of the heat exchange housing through the intake protal so that the heat exchange assembly can easily be serviced from the roof of the building.

It is an object of the present invention to provide a heat exchanging and ventilating unit for a commercial building which can incorporate a heat exchanging element therein and still utilize a conventionally commercially available ventilating fan in the unit to draw air out of the building.

It is another object of the present invention to provide a heat exchanging ventilating unit for a commercial building which includes a heat exchange element which is readily accessible for service thereto from the roof of the building.

It is yet another object of the present invention to provide a heat exchanging ventilating unit which includes liquid gathering means adjacent to the heat exchange element to prevent condensation from the heat exchange unit from fouling other parts of the air handling equipment of the building.

Other objects, advantages, and features of the present invention will become apparent from the following specification when taken in conjunction with the accompanying drawings.

DETAILED DESCRIPTION OF THE PREFERRED EMBODIMENT

Figure 1:
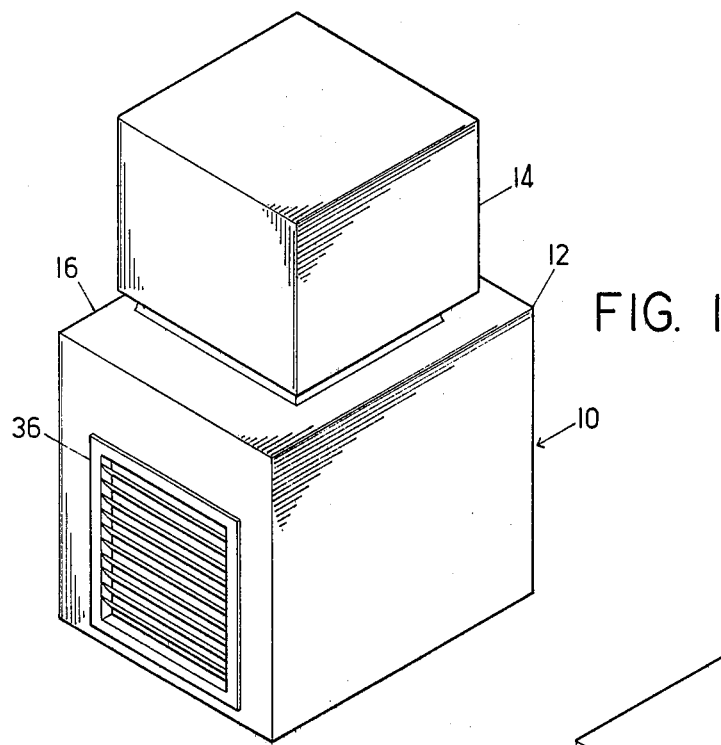
FIG. 1 is a perspective view of the heat exchanging ventilating unit constructed in accordance with the present invention.
Figure 2:
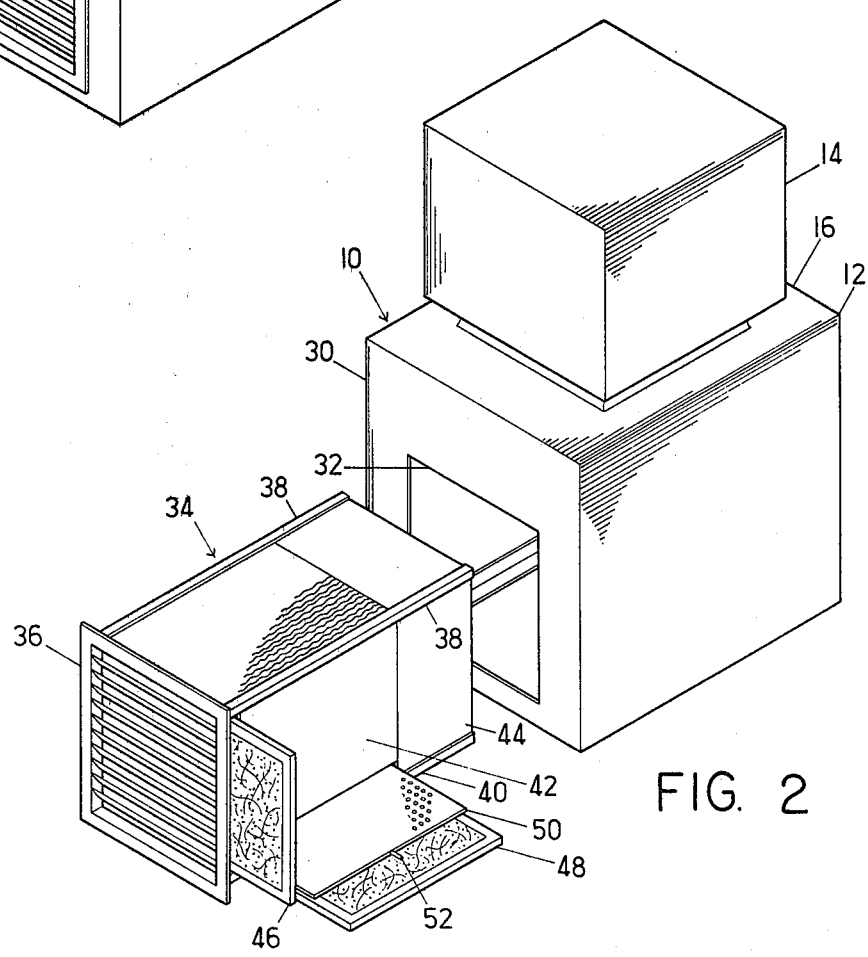
FIG. 2 is a perspective view of the heat exchange ventilating unit of FIG. 1 with the heat exchange assembly removed therefrom and shown in a partially disassembled fashion.

As shown in FIGS. 1 and 2, and generally illustrated at 10, is a heat exchanging ventilating unit constructed in accordance with the present invention. The larger, lower portion of the ventilating unit 10 is made up of a heat exchange housing 12 which is in the form of a rectangular enclosure constructed of metal or other similar light weight rigid material. Mounted on the top of the heat exchange housing 12 is a ventilating fan 14. The ventilating fan 14 is an updraft type ventilating fan of the type conventionally used on roof installations in commercial buildings having flat roofs. The ventilator fan 14 is mounted on a top plate 16 which serves as the top of the heat exchange housing 12. The top plate 16 has an exit portal 18 formed in the top thereof which is correspondingly sized and shaped so as to interfit with the open bottom of the ventilating fan 14 which is mounted thereover.

Figure 3:
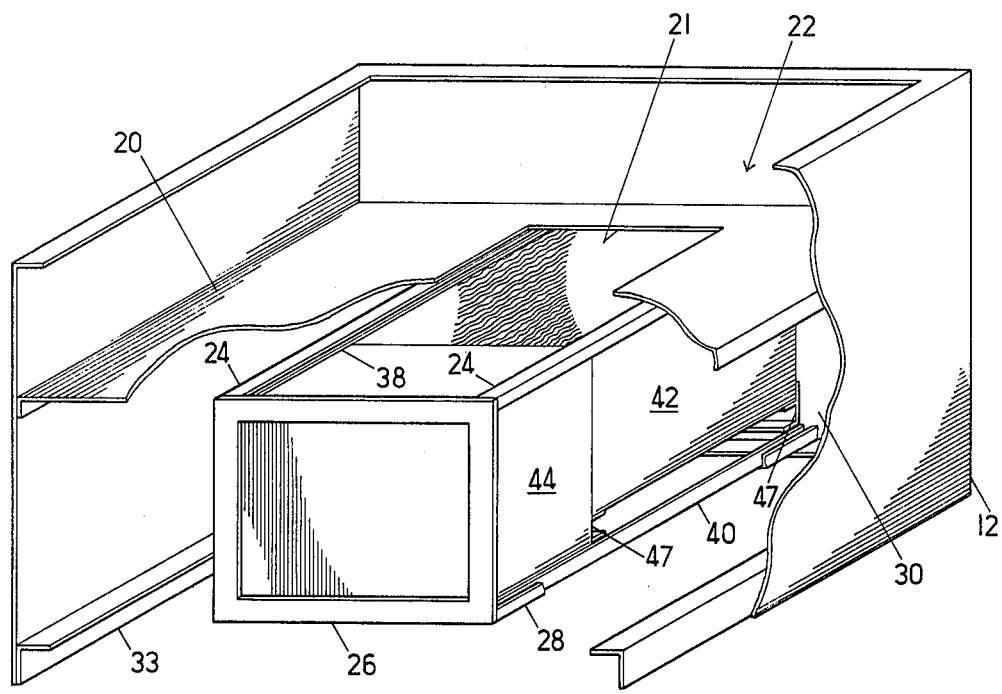
FIG. 3 is a perspective view, partly broken away, of the rear of the ventilating unit of the heat exchange ventilator of FIGS. 1 and 2.

Details of the interior of the heat exchange housing 12 can be seen in more detail in FIG. 3. In the view of the heat exchange housing 12 of FIG. 3, which is from the rear of the heat exchange housing 12, a portion of the rear of the heat exchange housing 12 and the entire top plate 16 have been removed for greater clarity in showing the interior thereof. The heat exchange housing 12 is divided into two portions by a horizontal dividing plate 20. Between the horizontal dividing plate 20 and the top plate 16 of the heat exchange housing 12 an exhaust plenum 22 is defined. An exhaust plenum portal 21, in the form of a rectangular cut-out in the dividing plate 20, is provided to allow fluid flow from the heat exchange element to the exhaust plenum 22 as will be described in more detail below. Secured on the interior underside of the dividing plate 20 are a pair of upper guide rails 24. The upper guide rails 24 are connected at their rear end to a rectangular end frame 26 which in turn is also connected at its bottom edge to a pair of lower guide rails 28. The upper and lower guide rails 24 and 28 extend linearly from the end frame 26 to the inside of one side 30 of the heat exchange housing 12. The side 30 of the heat exchange housing 12 has formed in it an intake portal 32 which is in the form of a large rectangular opening. The upper and lower guide rails 24 and 28 contact the inside of the side wall 30 just adjacent the respective four exterior corners of the intake portal 32. A set of mounting supports 33 are secured around the interior of the bottom edge of the outer walls of the heat exchange housing 12.

Shown in FIG. 2 in a semi-disassembled fashion is a heat exchange assembly 34 which is intended to be received within the heat exchange housing 12 by being slid through the intake portal 32. At its one end, the heat exchange assembly 34 includes a louvered grill 36 which is sized so as to fill the intake portal 32 and which is constructed so as to freely admit air therethrough. Extending rearwardly from the louvered grill 36 are pairs of upper and lower support rails 38 and 40 which provide structural support to the heat exchange assembly 34. The upper and lower support rails 38 and 40 extend rearwardly in a direction perpendicular to the plane of the grill 36.

Mounted inside of the support rails 38 and 40 is a heat exchange element 42. The heat exchange element 42 is formed so as to have a plurality of air passageways through it which are oriented along two perpendicular axes. The heat exchange element 42 is of the type which is fabricated from a plurality of stacked laminations with each even lamination having passages oriented along one of the two axes while each odd lamination has air passages oriented along the other axis. The heat exchange element 42 is incorporated into the heat exchange assembly 34 in such a fashion that one air passage is oriented from the bottom to the top of the heat exchange assembly 34, while the second air passage extends from the louvered grill 36 rearwardly through the heat exchange element 42 toward the rear of the heat exchange assembly 34, or the interior of the heat exchange housing 12. At the rear of the heat exchange assembly 34, and therefore also at the receiving end of that second air passage through the heat exchange element 42, an intake plenum 44 is provided. The intake plenum 44 is formed of sheet metal extending between the upper and lower support rails 38 and 40 between the upper support rails 38 and across the end frame 26 thus enclosing four sides and leaving the bottom of the intake air plenum 44, and one side of the intake air plenum, that adjoining the heat exchange element 42, open. Thus air passing through the second air passage of the heat exchange element 42, from the louvered grill 36 through the heat exchange element 42, passes into the intake air plenum 44 from which it may be exited through the bottom thereof.

A space is provided between the front of the heat exchange element 42 and the rear of the louvered grill 36 so that a filter 46 may be slidably positioned therein. Similarly, guides 47 are mounted on the heat exchange assembly 34 under the heat exchange element 42 so that a bottom filter 48 and a drain pan 50 may be positioned in them. The filters 46 and 48 are conventional air handling filters intended to be removable and either replaceable or cleanable. The drain pan 50 is a perforated plan which allows air passage therethrough, but which is constructed in such a fashion that fluid falling thereto is drained toward a nozzle 52 formed on one side thereof.

Figure 4:
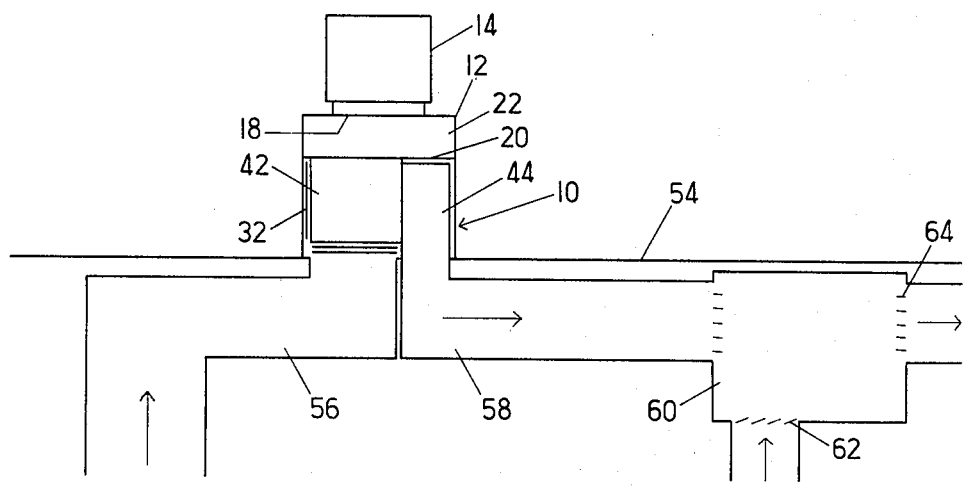
FIG. 4 is a schematic view illustrating the air flow in an installation of the ventilating unit of FIGS. 1 and 2 into a commercial building.

In a typical installation as shown in FIG. 4, the heat exchanging ventilator 10 of FIGS. 1 to 3 is mounted on the top of a roof 54 of a building, typically a commercial building. The open bottom of the heat exchanging ventilator 10 is positioned over a suitably formed opening in the roof 54 through which air handling connections may be made to the heat exchanging ventilator 10. As illustrated in FIG. 4, an exhaust air duct 56 is sized and positioned so as to connect to the ventilator 10 at the bottom of the heat exchange element 42 so as to also be isolated from the intake air plenum 44. As also illustrated in FIG. 4, an intake air duct 58 is sized and positioned underneath the ventilator 10 at the intake air plenum 44 so as to be in fluid communication therewith while being sealed from the bottom of the heat exchange element 42. The intake air duct 56 can be connected to any suitable air conditioning apparatus 60 which could include a heater, cooler, humidifier, dehumidifier, or any other air treating apparatus as may be desired for the particular building environment. Air exiting from the air conditioning apparatus 60 would be introduced into the interior of the building.

In its operation, the heat exchanging ventilator 10 is intended to serve as a ventilator for a commercial and industrial building while also providing heat exchange between the air being vented from and introduced into the building so as to recover heat which would otherwise be wasted during the ventilation process. Air exiting from the building passes through the exit air duct 56 and is directed into the bottom of the heat exchange element 42. The air is drawn through the exhaust air duct 56 and through the heat exchange element 42 by the force of the upblast ventilator fan 14 which is positioned on top of the combined ventilator 10. The upblast ventilator fan 14 creates a negative pressure in the exhaust plenum 22 sufficient to draw air through the heat exchange element 42 in an upward fashion. At the same time, the air conditioning apparatus 60 draws air through the louvered grill 36 and then horizontally through the heat exchange element 42 to the intake air plenum 44, from which it is conducted through the intake air duct 58 to the air conditioning apparatus 60. The air conditioning apparatus 60 also receives a selected amount of return air for recirculation through dampered inlet 62, and directs conditioned air to the duct system 64 of the building. In the heat exchange element 42, the exhaust air passing upwardly therethrough transmits a large percentage of its heat to the intake air passing simultaneously horizontally therethrough so that a large portion of the heat in the exiting air is returned to the intake air to the building. In this fashion, the ventilation process can be accomplished inside of the building without a complete loss of all of the heat contained in the air which is being vented from the building.

In its operation, the heat exchange ventilating unit 10 of FIGS. 1 to 4 provides several significant advantages over prior art devices. Firstly, the apparatus is particularly configured so it is capable of using a standard upblast bentilator for the ventilator fan 14. Since the ventilator fan 14 is attached to the apparatus 10 by the top plate 16 of the heat exchange housing 16, the size and mounting requirements of any conventional upblast ventilator fan 14 can be accommodated merely by alterations in the size of the exhaust portal 18 in the top plate 16. It is thus possible to use standard upblast ventilating fans 14 without the need for any special modification or adaptation. Thus the heat exchange housing 12 with the interior heat exchange assembly 34 received therein can be considered a separate modular unit which is merely placed between the ventilator fan 14 and the building roof 54. The conversion of a conventional ventilation system to the combined heat exchanging and ventilating unit 10 is a relatively simple retrofit operation. Similarly the combined unit 10 is relatively modular in character aiding its incorporation into new constructions.

As can also be observed by FIG. 2, the heat exchange assembly 34 itself can be removed from the heat exchange housing 12 by merely being slid out through one side thereof. This allows convenient and easy maintenance access to all the elements of the heat exchange assembly 34 from the exterior of the building merely by servicing the heat exchange housing 12 from the roof 54 of the building. From the roof 54 the heat exchange assembly 34 can merely be slid out of the heat exchange housing so that any of the filters 46 or 48 such as need replacing can be serviced and so that the drain pan 50 can be cleaned as required. Thus the servicing of the heat exchange assembly 34 is relatively easy to accomplish without disrupting the normal operation of the remainder of the air handling equipment in the installation and without requiring any disassembly of any other component parts of the air handling equipment. Since access to the heat exchange assembly 34 is from the roof of the building, no particular tools, scaffolds, or other equipment handling apparatus are necessary to accomplish this service.

It is to be understood that the present invention is not limited to the particular arrangement and description of parts illustrated and described herein, but includes all such modified forms thereof as come within the scope of the following claims.

I claim:

1. A combined ventilating and heat exchanging unit for a building comprising:
    a heat exchange housing (12) having an open bottom, an intake portal (32) on one side thereof, and an exit portal (18) on the top thereof, the heat exchange housing (12) adapted to being mounted on the roof of a building with the open bottom opening into the interior of the building;
    a ventilator fan (14) received on the top of the heat exchange housing (12) to draw air out from the exit portal (18) and exhaust it to the atmosphere;
    air handling and conditioning means connected to the bottom of the heat exchange housing (12) for conducting stale air to be exhausted to the housing (12) and to convey fresh air from the housing into the interior of the building; and
    a heat exchange assembly (34) capable of conducting a heat exchange between air passing from the air handling means through to the exit portal (18) and air passing from the intake portal (32) through to the air handling means; the heat exchange assembly (34) sized and shaped so that it can slide into and out of the heat exchange housing (12) through the intake portal (32) so that the heat exchange assembly (34) can easily be serviced from the roof of the building.

2. A combined ventilating and heat exchanging unit as claimed in claim 1 wherein the heat exchange housing (12) includes mounted in it a set of upper and lower guide rails (24, 28) and wherein the heat exchange assembly (34) includes in it pairs of upper and lower support rails (38, 40) with the guide rails (24, 28) and the support rails (38, 40) correspondingly sized, positioned and shaped so that the support rails (38, 40) are received in the guide rails (24, 28) as the heat exchange assembly (34) is slid into the heat exchange housing (12).

3. A combined ventilating and heat exchange unit for a building as claimed in claim 1 wherein the heat exchange assembly (34) includes a heat exchange element (42) mounted therein and also includes therein guides (47) adapted to receive a pair of filters (46, 48) so that air passing through each passage of the heat exchange element (42) is filtered before passing therethrough.

4. A combined ventilating and heat exchange unit for a building as claimed in claim 3 wherein one of the guides (47) located in the heat exchange assembly (34) under the heat exchange element (42) is sized to allow a drain pan (50) to be slid into the heat exchange assembly (34) under the heat exchange element (42) so that condensation formed in the heat exchange element (42) can be drained from the unit without draining into the air handling means.

5. A combined ventilating and heat exchanging unit for a building as claimed in claim 1 wherein the heat exchange assembly (34) includes a heat exchange element (42) for conducting a heat exchange between air passing horizontally and vertically through it and also includes an intake air plenum (44) to receive air passing horizontally through the heat exchange element (42), the air handling means connected to the bottom of the heat exchange housing (12) so that air to be conducted out of the building is transferred to the bottom of the heat exchange element (42) while air to be introduced into the building is drawn from the intake air plenum (44).

6. A combined ventilating and heat exchanging unit for a building as claimed in claim 5 wherein a horizontal dividing plate (20) is mounted in the heat exchange housing (12) above the heat exchange assembly (34) to define an exhaust plenum thereabove inside of the heat exchange housing (12), the horizontal dividing plate (20) including an exhaust plenum portal (21) formed therein and positioned over the heat exchange element (42) so that air passing from the top of the heat exchange element (42) can be exhausted by the ventilating fan (14).

7. A combined ventilating and heat exchanging unit for a building comprising:
    a heat exchanging housing (12) having an open bottom, an intake portal (32) on one side thereof, and an exit portal (18) on the top thereof, the heat exchange housing (12) adapted to being mounted on the roof of a building with the open bottom thereof opening into the interior of the building;
    a heat exchange assembly (34) located adjacent to the bottom of the heat exchange housing (12);
    a heat exchange element (42) positioned in the heat exchange assembly (34), the heat exchange element (42) having two perpendicular paths of air flow therethrough, oriented horizontally and vertically respectively and being capable of conducting a heat exchange between the air passing through the two air flow passages, the heat exchange element (42) located adjacent to the intake portal (32) so that air passing through the intake portal (32) passes through the horizontal passage in the heat exchange element (42);

an intake air plenum (44) located adjacent to the heat exchange element (42) in the heat exchange assembly (34) so as to receive air passing through the horizontal passage of the heat exchange element (42), the intake air plenum (44) open on the bottom thereof so that air passing therethrough may be introduced into the interior of the building;

a ventilator fan (14) received on top of the heat exchange housing (12) on top of the exit portion (18) so as to draw air out from the exit portion (18) and exhaust it into the atmosphere; and a horizontal dividing plate (20) located in the heat exchange housing (12) and having an exhaust plenum portal (21) formed therein sized and positioned so as to be received directly above the top of the heat exchange element (42) so that air passing vertically through the heat exchange element (42) is admitted through the exhaust plenum portal (21) into an exhaust plenum (22) defined between the horizontal dividing plate (20) and the top of the heat exchange housing (12).

8. A combined ventilating and heat exchange unit for a building as claimed in claim 7 wherein the heat exchange assembly (34) can be slid into and out of the heat exchange housing (12) through the intake portal (32) so as to facilitate service of the heat exchange assembly (34) from the roof of the building onto which the unit is installed.

9. A combined ventilating and heat exchanging unit as claimed in claim 8 wherein there are pairs of upper and lower guide rails (24, 28) installed in the interior of the heat exchange housing (12) and wherein there are upper and lower support rails (38, 40) installed on the exterior of the heat exchange assembly (34), the guide rails (24, 28) and the support rails (38, 40) correspondingly sized, and positioned so that the support rails (38, 40) are received in the guide rails (24, 28) as the heat exchange assembly (34) in slid into the heat exchange housing (12).

10. A combined ventilating and heat exchanging unit as claimed in claim 9 wherein included in the heat exchange assembly (34) are pairs of filters (46, 48) which are designed to filter air prior to it passing through the heat exchange element (42).

* * * * *